(No Model.)
B. F. WHEELER.
MANUFACTURE OF MILLING CUTTERS.
No. 264,008. Patented Sept. 5, 1882.
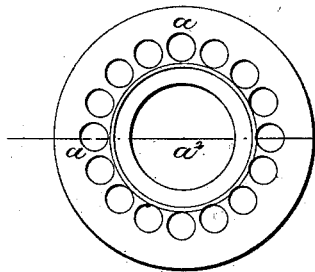
Fig. 1.
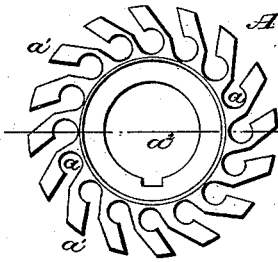
Fig. 3.
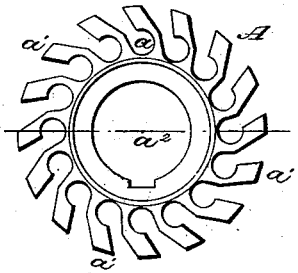
Fig. 5.
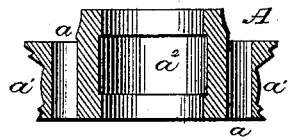
Fig. 2.
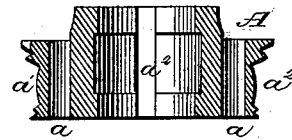
Fig. 4.
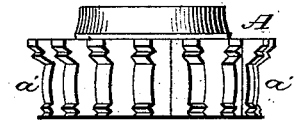
Fig. 6.
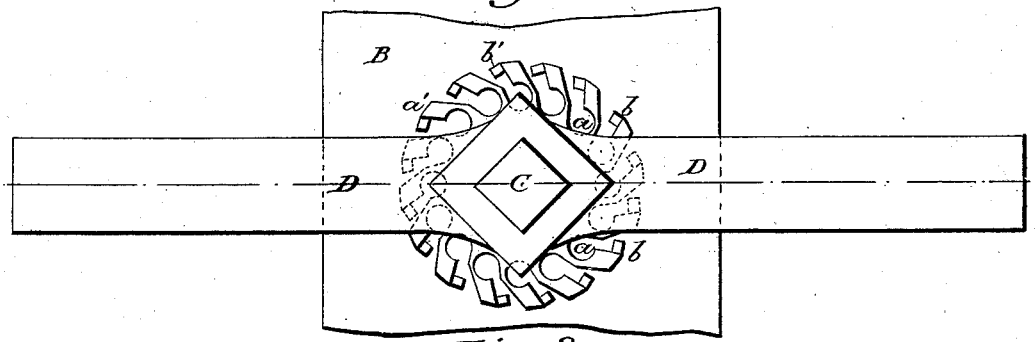
Fig. 7.
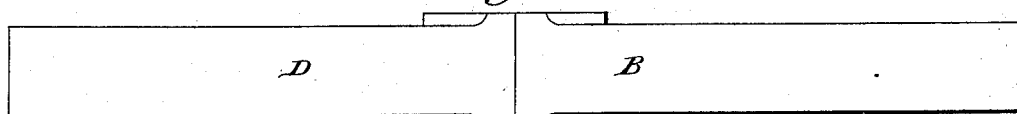
Fig. 8.
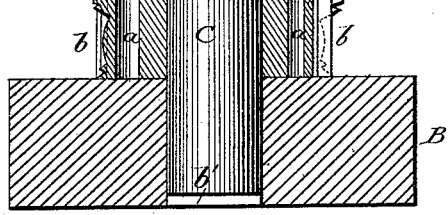
Witnesses:
G. B. Maynadier
John R. Snow
Inventor
B. F. Wheeler
by J. E. Maynadier
his Atty
N. PETERS. Photo-Lithographer, Washington, D. C.

UNITED STATES PATENT OFFICE.

BENJAMIN F. WHEELER, OF MALDEN, ASSIGNOR TO OSCAR L. NOBLE, OF BOSTON, MASSACHUSETTS.

MANUFACTURE OF MILLING-CUTTERS.

SPECIFICATION forming part of Letters Patent No. 264,008, dated September 5, 1882.

Application filed January 9, 1882. (No model.)

*To all whom it may concern:*

Be it known that I, BENJ. F. WHEELER, of Malden, in the county of Middlesex and State of Massachusetts, have invented certain new and useful Improvements in the Manufacture of Rotary Cutters for Trimming Sole-Edges, of which the following is a full, clear, and exact description, reference being had to the accompanying drawings, in which—

Figure 1 is a side elevation, and Fig. 2 a cross-section, of the cutter-blank as first turned and bored. Figs. 3 and 4 are like views of the cutter-blank with the teeth milled in it. Fig. 5 is a side elevation, and Fig. 6 an end elevation, of the finished cutter, showing the teeth bent back. Fig. 7 is a plan, and Fig. 8 is a sectional view, of the jig-plate with the cutter in place, with its teeth against the stationary pins in the jig-plate, and showing the wrench by which the teeth are simultaneously and equally turned back to give the clearance.

My invention consists in the manufacture of cutters, as now to be explained.

The blank A is first turned to the desired shape, and a number of holes, $a$, (the same as the number of teeth $a'$ desired,) are then drilled, as shown in Fig. 1. The blank A so prepared is milled, as shown in Fig. 3, to form the teeth $a'$, which, as is evident, are now all on the same circle to which they were turned. The blank A is now placed on the jig-plate B, which is provided with a number of pins, $b$, rigidly attached to it. These pins $b$ are placed to exactly coincide with the teeth $a'$ and concentric with an opening, $b'$, in the jig-plate B. The cutter A is placed so that its opening $a^2$ coincides with the opening $b'$ in the jig-plate B, and with each one of its teeth $a'$ against one of the pins $b$. A mandrel, C, is securely keyed to the cutter A, and the end of the mandrel projects into the opening in the jig-plate. A wrench, D, is now placed on the mandrel C, as shown in Fig. 7, by turning which the teeth $a'$ are bent back simultaneously and equally to an extent regulated by a suitable stop, thus bringing the front and rear faces of the teeth on different circles, as shown in Fig. 5, and thereby giving them the requisite clearance.

Heretofore in the manufacture of rotary cutters the backing off or clearance of the teeth or blades has been produced by bending each tooth backward separately, as shown in Patent No. 212,971, March 4, 1879, to W. D. Orcutt. The objection to this method is the difficulty in giving each tooth exactly the same amount of bend.

By my improved method the teeth are all bent at the same time and each to the same extent.

I claim as my invention—

In the manufacture of rotary cutters, producing the clearance of the teeth by forming them as described, and all on the same circle, then bending them all backward simultaneously and equally by means of the retaining-pins and wrench, substantially as set forth.

BENJ. F. WHEELER.

Witnesses:
W. A. COPELAND,
JOHN R. SNOW.